C. E. MILLS.
FRONT END SUSPENSION STRUCTURE FOR SELF PROPELLED VEHICLES.
APPLICATION FILED JULY 16, 1919.
1,348,512. Patented Aug. 3, 1920.
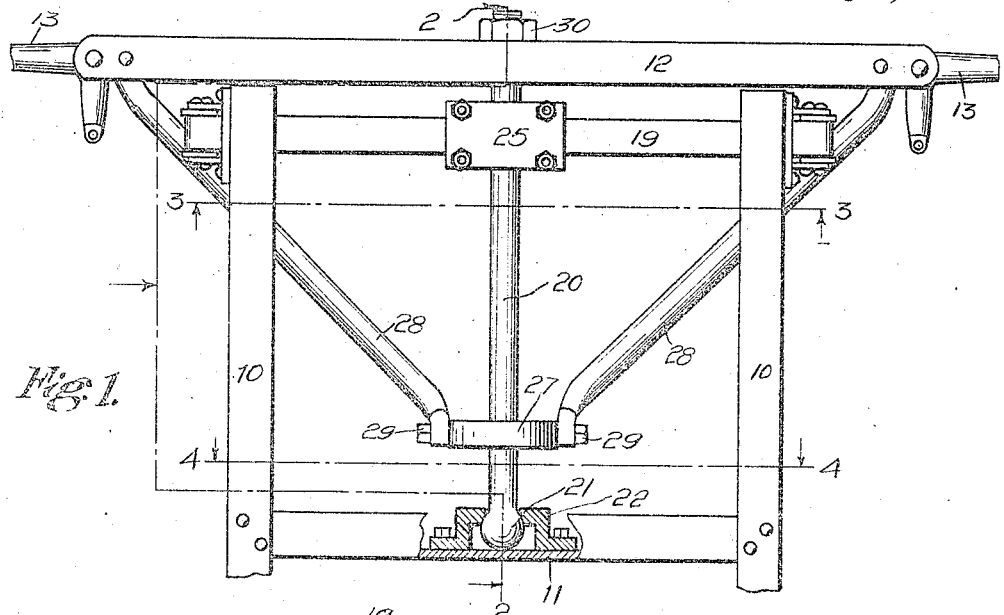
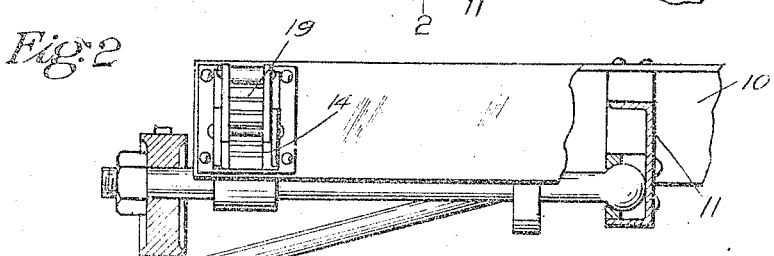
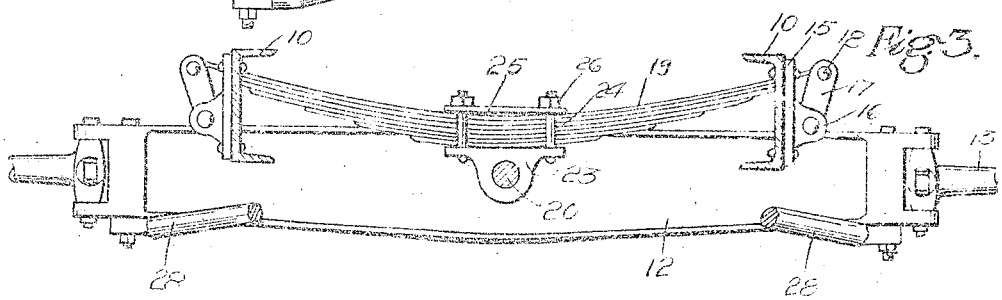
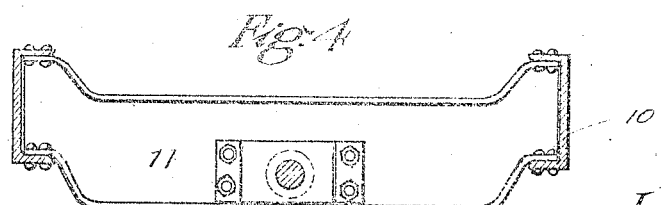

UNITED STATES PATENT OFFICE.

CLAUD E. MILLS, OF DES MOINES, IOWA.

FRONT-END SUSPENSION STRUCTURE FOR SELF-PROPELLED VEHICLES.

1,348,512.             Specification of Letters Patent.     Patented Aug. 3, 1920.

Application filed July 16, 1919. Serial No. 311,376.

*To all whom it may concern:*

Be it known that I, CLAUD E. MILLS, a citizen of the United States, and a resident of Des Moines, in the county of Polk and State of Iowa, have invented a certain new and useful Front-End Suspension Structure for Self-Propelled Vehicles, of which the following is a specification.

The object of my invention is to provide a front end suspension structure of simple, durable, inexpensive and strong structure, whereby the front end of a self-propelled vehicle may be supported on an axle in such manner that the axle may have free up and down play at its ends, which may be necessary on account of inequalities in the road, and whereby the frame of the machine may be at all times held level.

With this and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view partly in section of a suspension structure embodying my invention.

Fig. 2 shows a detail, sectional view taken on the line 2—2 of Fig. 1.

Fig. 3 shows a transverse, sectional view taken on the line 3—3 of Fig. 1.

Fig. 4 shows a horizontal, sectional view taken on the line 4—4 of Fig. 1, looking in the direction indicated by the arrows.

In the accompanying drawings, which illustrate a form in which my invention may be embodied, I have used the reference numeral 10 to indicate generally the laterally spaced horizontal frame members of a tractor or other motor vehicle. These frame members may be formed of channel bars opening toward each other.

The frame members 10 are connected by a transverse frame member 11 located rearwardly of the forward ends of said frame members 10.

Spaced forwardly with relation to the front end of the frame of the machine is the transverse axle 12, to the ends of which are pivoted the stub axles 13 which are designed to supporting steerable front wheels.

The frame members 10 are provided near their front ends with vertically elongated slots 14 alined with each other transversely of the machine.

On the outer surfaces of the frame members 10 on opposite sides of each of the slots 14 are brackets 15 having ears 16.

Pivoted to each ear 16 is an upwardly extending link 17. The upper end of each pair of links 17 is connected by a short shaft 18.

Rotatably supported on each shaft 18 is one end of a leaf spring 19.

Fixed in the axle 12 centrally of the machine from side to side is a rearwardly extending rod 20, having on its rear end adjacent to the transverse frame member 11 a ball or the like 21, received in a casing 22 to form a ball and socket joint.

Other forms of universal joints may be employed for the purpose, but the one described is the preferred form.

Beneath the center of the spring 19 is a bracket 23 which forms a journal for the rod and is held in position by bolts 24 extending upwardly on the opposite sides of the spring 19, and through a plate 25 resting on top of said spring. On the bolts 24 are nuts 26.

Fixed on the rod 20 near the rear end thereof is a collar 27. Brace rods 28 are secured by screw-bolts 29 or the like to the opposite sides of the collar 27 and extend forwardly and outwardly as shown in Fig. 1.

At their forward ends the brace rods 28 are secured to the axle 12. The forward end of the rod 20 may be screw-threaded to receive a nut 30.

It will be noted that the weight of the forward end of the frame is supported on the spring 19 through the medium of the link 17. Weight is also imposed on the axle 12 through the rod 20 which is supported by the spring and on the cross frame member 11. It will be noted that if the axle 12 tilts up and down at either end, for moving the axle 12 out of a horizontal transverse position, the rod 20 will rotate in the socket 22 and the bearing or bracket 23, and the forward end of the frame will not in any way be caused to vary from horizontal position.

There is provided at the same time a very strong and simple suspension structure.

Changes may be made in the details of my structure without departing from the essential principle of my invention, and it is my intention to cover by my claims any modified forms of structure or use of mechanical equivalents which may be reasonably included within their scope.

I claim as my invention:

1. In a device of the class described; a frame; a front axle adjacent thereto, a rod secured to said front axle and extending longitudinally of said frame, and connected with said frame by means of a universal joint, a spring supported on said frame, said rod being operatively connected with said spring between said axle and said universal joint, a collar on said rod between said spring and said universal joint, and a brace rod extending from said collar to said axle on opposite sides of said rod.

2. In a device of the class described; the combination of a frame with an axle; links on said frame; a spring supported on said links; a transverse member on said frame; a rod connected with said transverse member by means of a universal joint; said rod being secured to said axle and being rotatably connected with said spring.

3. In a device of the class described; the combination of a frame with an axle; links on said frame; a spring supported on said links; a transverse member on said frame; a rod connected with said transverse member by means of a universal joint; said rod being secured to said axle and being rotatably connected with said spring; and brace rods connecting said first rods near said universal joint with said axle on opposite sides of said first rod.

CLAUD E. MILLS.